(12) United States Patent
Safaee-Rad et al.

(10) Patent No.: US 7,308,157 B2
(45) Date of Patent: Dec. 11, 2007

(54) METHOD AND APPARATUS FOR OPTICAL INSPECTION OF A DISPLAY

(75) Inventors: Reza Safaee-Rad, Etobicoke (CA); Aleksander Crnatovic, Toronto (CA); Jeffrey Hawthorne, San Francisco, CA (US); Branko Bukal, Thornhill (CA); Ray Leerentveld, Palgrave (CA)

(73) Assignee: Photon Dynamics, Inc., San Jose, CA (US)

( * ) Notice: Subject to any disclaimer, the term of this patent is extended or adjusted under 35 U.S.C. 154(b) by 838 days.

(21) Appl. No.: 10/771,126

(22) Filed: Feb. 2, 2004

(65) Prior Publication Data

US 2004/0213449 A1 Oct. 28, 2004

Related U.S. Application Data

(60) Provisional application No. 60/444,889, filed on Feb. 3, 2003.

(51) Int. Cl.
G06K 9/32 (2006.01)

(52) U.S. Cl. ............... 382/294; 382/141; 382/151; 382/284; 358/505; 358/540; 358/450

(58) Field of Classification Search ............... 382/141, 382/151, 274, 284, 294; 358/505, 540, 448, 358/450, 452
See application file for complete search history.

(56) References Cited

U.S. PATENT DOCUMENTS

| | | | |
|---|---|---|---|
| 5,418,371 A | 5/1995 | Aslund et al. | |
| 5,650,844 A | 7/1997 | Aoki et al. | |
| 5,703,362 A * | 12/1997 | Devitt et al. | 250/341.8 |
| 6,166,366 A * | 12/2000 | Lewis et al. | 250/208.1 |
| 6,177,955 B1 | 1/2001 | Downen et al. | |
| 6,266,437 B1 * | 7/2001 | Eichel et al. | 382/149 |
| 6,323,922 B1 | 11/2001 | Suzuki et al. | |
| 6,504,943 B1 * | 1/2003 | Sweatt et al. | 382/103 |
| 6,531,707 B1 | 3/2003 | Favreau et al. | |
| 6,874,420 B2 * | 4/2005 | Lewis et al. | 101/485 |
| 2002/0075439 A1 | 6/2002 | Uehara | |

\* cited by examiner

*Primary Examiner*—Yosef Kassa
(74) *Attorney, Agent, or Firm*—Townsend and Townsend and Crew LLP

(57) ABSTRACT

A method and apparatus for optically inspecting a display employs sub-pixel accuracy for each primary color to take into account angle of rotation. The method includes capturing images of a display with R×S sensors; determining sets of sensor coordinates mapping to a pixel, determining multiple misalignment angles between the pixel on the display and the R×S sensors, determining multiple x scaling ratios, determining multiple weighting factors associated with R×S sensors in response to the corresponding multiple misalignment angle and the corresponding multiple x and y scaling ratios, determining multiple luminance values for R×S sensors, determining multiple total luminance values in response to the weighting factors and the luminance values, forming scaled images including first and second luminance values, and inspecting the scaled image to identify potential defects of the pixel on the display.

20 Claims, 12 Drawing Sheets

METHOD AND APPARATUS FOR OPTICAL INSPECTION OF A DISPLAY

CROSS-REFERENCES TO RELATED APPLICATIONS

The present application claims priority to and incorporates by reference, for all purposes, Provisional No. 60/444,889 filed Feb. 3, 2003.

BACKGROUND OF THE INVENTION

The present invention relates to inspection systems. More particularly, the present invention relates to improved optical inspection systems for inspecting flat-panel substrates or displays, such as liquid crystal displays (LCDs).

Relatively simplistic methods have previously been proposed for inspection of LCD panels. One such method is described in U.S. Pat. No. 5,650,844. The '844 patent describes using a single CCD camera having 1534×1024 pixels to capture an image of an entire LCD panel having 640×480 pixels. The technique described simply discloses determining whether LCD pixels are on or off.

There are many real-world drawbacks to the methods described in the '844 patent. One such drawback is that LCD panels have different illumination properties at different viewing angles. Accordingly, when attempting to capture an entire LCD panel with a single camera, as taught, the image acquired by the camera will have viewing angles artifacts at different parts of the LCD panel that would interfere with inspection of the LCD panel. Other optical drawbacks include geometric distortion of the image of the LCD panel.

Another drawback is that the '844 patent appears to assume that the panel and camera are perfectly aligned, that is that there is no misalignment angle between them. In practice, in a typical manufacturing line, the misalignment angle between the panel and camera is not insignificant. For example, typical assembly line positioning systems would be accurate to <5 degrees, <10 degrees or the like. It would be prohibitively expensive and very time consuming (in the manufacturing line) to have a positioning system that could provide a misalignment accuracy, for example <0.01 degrees, small enough so that the misalignment angle could be disregarded. Because typical manufacturing lines do not have such accurate positioning systems, the '844 does not provide a practical solution.

Yet another drawback is that the '844 patent does not address detection of defective sub-pixels of an LCD pixel, and does not address the detection of defects in portions of sub-pixels of an LCD panel. The '844 patent only appears to describe inspecting contrast ratios in LCD pixels. In contrast, in the industry, manufacturers are concerned with inspecting sup-pixels of a display pixel, for example red, blue, and green sub-pixels. Further, manufacturers are interested in identifying sub-pixels which are partially defective so they can repair the defects.

Simply using higher resolution camera along with the teaching of the '844 patent, would still have drawbacks. One such drawback is the viewing angle artifacts described above. Another drawback is that there is no teaching about processing images of different colors differently. In contrast, the inventors of the present invention have discovered that when inspecting test scenes (images) while exciting only red, blue, or green pixels, it is highly desirable to use different calibration parameters, driving parameters, and thresholds to provide accurate defect position identification.

Simply using one camera to take multiple images of a display panel or multiple cameras to take one image of a display panel along with the teaching of the '844 patent, would still have drawbacks. One drawback is that in practice, it is virtually impossible to perfectly align the display pixels of each camera to a display panel. Accordingly, processing of such images using the teaching of the '844 patent would be inaccurate as each camera image will have a different misalignment angle. Further, using a single camera multiple times would be a very time consuming process, and unacceptable for use on a manufacturing line.

In light of the above, what is desired are methods and apparatus for detecting defects in sub-pixels of a display panel, without the drawbacks described above.

SUMMARY OF THE INVENTION

According to the present invention a method and apparatus for optically inspecting a display employs sub-pixel accuracy for each primary color to take into account angle of rotation. The method includes capturing images of a display with R×S sensors, determining sets of sensor coordinates mapping to a pixel, determining multiple misalignment angles between the pixel on the display and the R×S sensors, determining multiple x scaling ratios, determining multiple weighting factors associated with R×S sensors in response to the corresponding multiple misalignment angle and the corresponding multiple x scaling ratios, determining multiple luminance values for R×S sensors, determining multiple total luminance values in response to the weighting factors and the luminance values, forming scaled images including first and second luminance values, and inspecting the scaled image to identify potential defects of the pixel on the display present invention relates to improved optical inspection systems for inspecting flat-panel substrates or displays, such as liquid crystal displays (LCDs).

Many solutions have been previously developed for inspecting flat-panel substrates. The assignee of the present patent application, Photon Dynamics, Incorporated is also the assignee of several of the pioneering patents in the field of substrate inspection. With the increasing size of display substrates, and the increasing requirement for flexible and accurate inspection systems, the inventors of the present application have developed additional hardware and software techniques to enhance the inspection process.

The inventors of the present invention have determined that many different factors may be considered to improve the inspection process. This includes: optics: a small angle of view, flat field of view (FOV), average focus level for all three colors, and four filters (red, green, blue, neutral density); sensor array: a desired magnification ratio of at least 4 sensor pixels to 1 display pixel, and parallel and independent image capture, processing and analysis; image processing: coarse detection of candidate defects based on global thresholds on scaled-down or normalized images and fine analysis of the candidate defects based on local thresholds on raw or scaled-down images; color validation: (for sub-pixel and line) based on sub-pixel locations of defects; and dynamic exposure adjustment: addressing within and in-between luminance variations of panels.

A variety of components which individually contribute to an inspection system and can be variously combined in an inspection system are disclosed herein. This includes: improved optical/sensing configurations including off-axis configuration, XYZ movable configurations, auto-focus cameras with internal filters, and the like; implementations of adaptive scaling algorithms; implementations of background equalization (BGE) and normalization algorithm implementations, and the like.

Quality control of flat-panel displays includes detection and classification of various types of defects. Specifically, defects on LCD panels (both at Cell stage and Module stage) can be categorized into three major groups: high-contrast defects, low-contrast defects and very low-contrast defects.

The first group of defects consists of RGB sub-pixel (i.e., dot) and RGB line defects. The relative-contrast of these defects ranges from full off and on (i.e., stuck-off and stuck-on) to partially off and on (e.g., ⅓ off or ⅔ on). Additionally, such defects might occur as adjacent clusters. For example, a stuck-on red sub-pixel might be located besides a partially green sub-pixel. The required information to detect includes exact 2D location, relative contrast, type of adjacency, etc.

A second group of defects includes impurities in a panel (which can occur between different layers of a panel: backlight, diffuser film, polarizer films, color filter film, LCD glass, or the like). These defects are typically low-contrast defects. Typically, such defects are small (e.g., less than 16 LCD pixels) and with relative contrast between 4-10% relative to non-defective pixels. The required information to detect includes location, size, relative contrast and presence/absence of halo around such defects, and the like.

The third group of defects consists of very low contrast defects. Very-low contrast defects are often called mura defects in the industry (which means stain in Japanese). Mura defects can have a wide range of sizes (e.g., from 10 LCD pixels to 100,000 LCD pixels), shapes (e.g., circular, vertical or horizontal narrow and wide lines, spiral form, oblique lines—e.g., rub-lines, random geometrical forms, etc.) and relative-contrast (e.g., as low as 1% to 5-6% relative contrasts). Such mura defects often do not have well-defined boundaries. The required information of such defects includes location, size, relative contrast, and the like.

Other types of defects, such as polarizer scratch, or the like are contemplated. However such type of defects can be typically placed in one of the above groups of defects, along with information such as polarities, brightness, dimness, and the like.

In light of the above, the inventors have developed apparatus and methods to enhance the detection of defects. As will be described further below, four major techniques are discussed including: an off-line system calibration process, an on-line system calibration process, an on-line image capture, processing and analysis process, and an on-line XY merging and Z merging process.

Embodiments of the present invention include a novel optical/sensing configuration including a multi-camera-system strategy (i.e., an array of cameras) with a very narrow angle of view for each camera.

Other embodiments include an adaptive scaling technique that significantly suppresses a Moire pattern noise formed due to the mismatch between sizes of display pixels and sensor pixels. As is known, Moire interference patterns are a periodic modulation of the image voltage signal created by the sensor. The period of modulation is a function of the period of the pattern of the sensor pixels and the display pixels. The periodic modulation of the image often impedes the ability of an inspection system to detect and characterize real defects that may be present on the flat panel display. The real defects also modulate the signal but tend not be periodic in nature.

In the present embodiments, an adaptive scaling algorithm reduces the size of the raw image from a CCD sensor resolution (e.g., 1600×1200) to a scaled-down image resolution (e.g., 400×300 for magnification ratio of 4 CCD pixels to 1 display pixel) increases the gray-level dynamic range (e.g., from 8-bits to ~12 bits), and compensates for misalignment between the camera sensor pixel array and display panel pixel array. In the present embodiments, inspection and analysis includes the concept of global detection of candidate defects and local analysis of candidate defects. In other words, a global threshold is applied to identify candidate defects in scaled-down images or normalized images; and a localized threshold is applied to perform a fine analysis on the candidate defects in raw images or locally normalized images.

According to one aspect of the invention, a method for a computer system is described. One technique includes capturing a plurality of images, a minimal set being a first image and a second image, of a pixel on a display at coordinates (m,n) with an array of R×S sensors in an image sensor, determining a first and a second set of coordinates on the image sensor that map to coordinates (m,n) on the display for a first and a second group of sub-pixels, respectively, in response to the first and second image, respectively, determining a first and a second misalignment angle between the pixel on the display and the array of R×S sensors for the first group and the second group of sub-pixels, respectively, and determining an first and a second magnification ratio (x and y) of pixels in the display relative to sensors in the image sensor for the first group and the second group of sub-pixels. Various techniques also include determining a first and a second plurality of weighting factors Wij, where i=1 to R, and j=1 to S, respectively associated with sensors from the array of R×S sensors in response to the first and second misalignment angle, and the first and the second x and y magnification ratios, respectively, determining a first and second plurality of luminance values Lij, where i=1 to R, and j=1 to S, respectively associated with the sensors from the array of R×S sensors, and determining a first and second luminance value Imn, according to the following relationship: Imn=Σ(Wij*Lij) for i=1 to R, and j=1 to S, in response to the first and second plurality of weighting factors and the first and second plurality of luminance values, respectively. Steps may also include forming a first and a second reduced scaled image including a plurality of pixels, wherein a luminance value for a pixel at coordinate (m, n) in the first and the second reduced scaled image is determined in response to the first and the second luminance value Imn, respectively, and inspecting the first and the second reduced scaled image to identify potential defects of the pixel on the display.

According to another aspect of the present invention, an inspection system is disclosed. The apparatus may include at least one sensor configured to acquire a first and a second image of a portion of a flat-panel display, wherein at least one array of R×S sensors are configured to capture an image of at least one display pixel in the flat-panel display and a processing unit coupled to at least the one sensor configured to determine a defect in the flat-panel display in response to at least the first and the second image of the portion of the flat-panel display. The processing unit typically includes a processor configured to instruct the at least one sensor to capture the first image and the second image of the display pixel with the array of R×S sensors. The processor is also configured to determine a first and a second plurality of weighting factors Wij, where i=1 to R, and j=1 to S, respectively associated with sensors from the array of R×S sensors, for the first image and the second image, is configured to determine a first and a second plurality of luminance values Lij, where i=1 to R, and j=1 to S, respectively associated with the sensors from the array of R×S sensors in response to the first image and the second of the one display pixel, and is configured to determine a first and a second luminance value Imn, in response to Wij and Lij for i=1 to R, and j=1 to S. In various systems, the processor is also configured to determine a first and second scaled-down image including a plurality of pixels, wherein a luminance value associated with the one display pixel in the first and the second scaled-down image is determined in response to the first and the second luminance value Imn, respectively and is configured to inspect the first and second scaled-down image to identify potential defects of the pixel on the display.

According to yet another aspect of the invention, a method for a computer system is described. The method may include capturing a first image of at least a portion of a display, wherein an image of a first sub-pixel in a display pixel is captured with an array of sensor pixels in an image sensor, capturing a second image of at least the portion of a display, wherein an image of a second sub-pixel in the display pixel is captured with the array of sensor pixels in the image sensor, determining a first position and a first orientation of the display with respect to the image sensor in response to the first image, and determining a second position and a second orientation of the display with respect to the image sensor in response to the second image. In various techniques, additional steps may include for each sensor pixel in the array of sensor pixels, determining a first percentage of overlap of the sensor pixel on top of the display pixel in response to the first position and the first orientation, for each sensor pixel in the array of sensor pixels, determining a second percentage of overlap of the sensor pixel on top of the display pixel in response to the second position and the second orientation, for each sensor pixel in the array of sensor pixels, determining a first intensity value in response to the first image of the display pixel, and for each sensor pixel in the array of sensor pixels, determining a second intensity value in response to the second of the display pixel. Additional techniques may include determining a first weighted intensity value associated with the display pixel in response to the first percentage of overlap for each sensor pixel and in response to the first intensity value for each sensor pixel, determining a second weighted intensity value associated with the display pixel in response to the second percentage of overlap for each sensor pixel and in response to the second intensity value for each sensor pixel, forming a first scaled image in response to the first weighted intensity value, and forming a second scaled image in response to the second weighted intensity value. The first and the second scaled images may be inspected to determine potential defects in the display.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
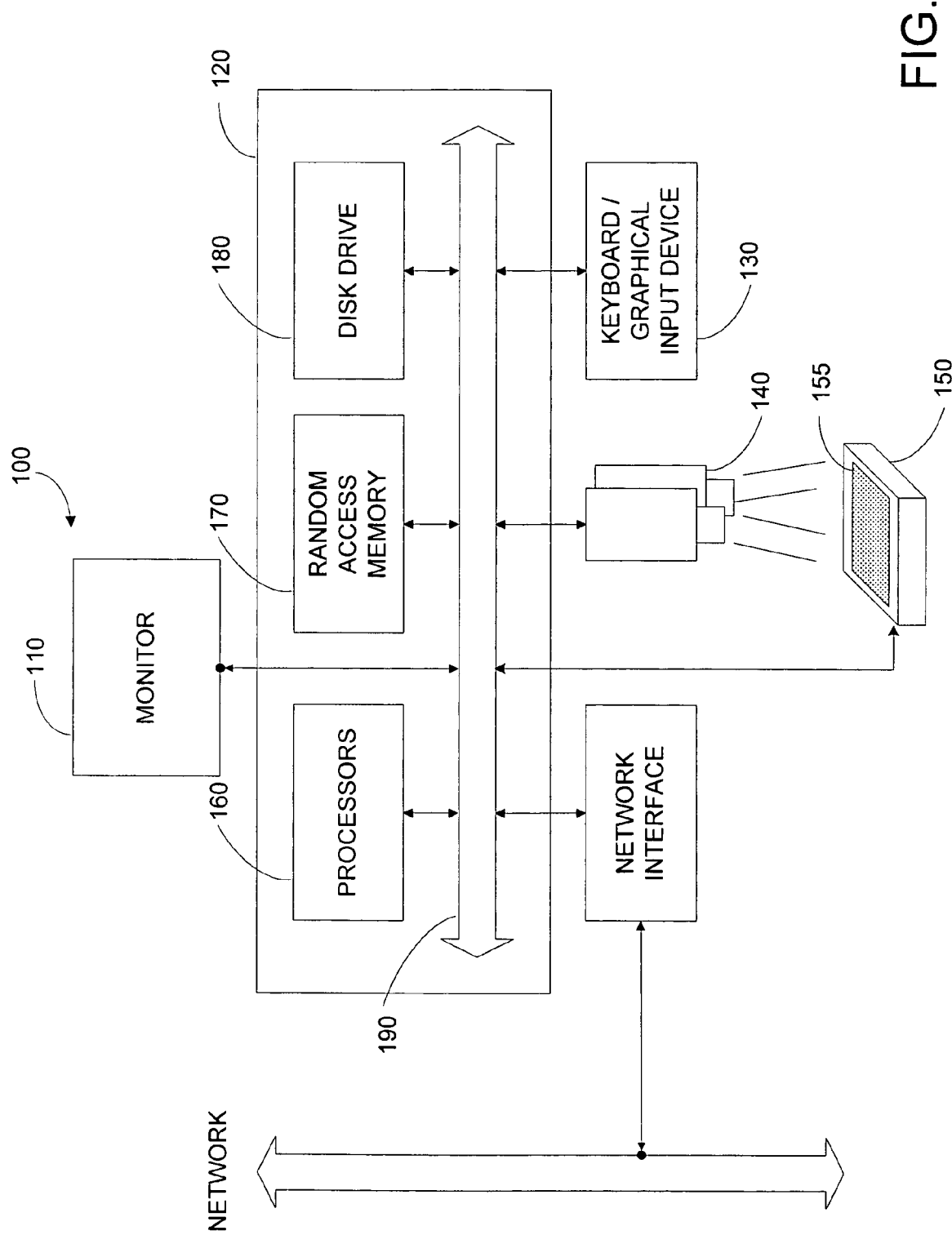
FIG. 1 illustrates a block diagram of an inspection system according to one embodiment of the present invention.

FIG. 1 is a block diagram of an inspection system 100 according to an embodiment of the present invention.

In the present embodiment, computer system 100 typically includes a monitor 110, computer 120, a keyboard and user input device 130, a network interface, and the like. Additionally, in the present embodiment, computer system 100 may include or may be coupled to one or more image sensors 140, and a work piece 155. In additional embodiments, a positioning platform 150 may be provided.

In the present embodiment, user input device 130 is typically embodied as a computer mouse, a trackball, a track pad, wireless remote, and the like. Keyboard and user input device 130 typically allows a user to select objects, icons, text, make entries and the like that appear on the monitor 110.

Embodiments of a network interface typically include an Ethernet card, a modem (telephone, satellite, cable, ISDN), (asynchronous) digital subscriber line (DSL) unit, and the like. A network interface is typically coupled to a computer network as shown. In other embodiments, a network interface may be physically integrated on the motherboard of computer 120, may be a software program, such as soft DSL, or the like.

Computer 120 typically includes familiar computer components such as one or more microprocessors 160, and memory storage devices, such as a random access memory (RAM) 170, disk drives 180, and system bus 190 interconnecting the above components.

In one embodiment, computer 120 is a PC compatible computer having multiple microprocessors such as PentiumIV™ microprocessor from Intel Corporation. In one embodiment, computer 120 includes four to eight processors that operate in parallel. Further, in the present embodiment, computer 120 may include a UNIX-based operating system.

RAM 170 and disk drive 180 are examples of tangible media for storage of data, audio/video files, computer programs, applet interpreters or compilers, virtual machines, embodiments of the herein described invention including: image data files, defect image data files, adaptive scaling algorithms, background and image equalization algorithms, positioning algorithms for platform 150, image sensor 140, and like. Additionally, the tangible media may include image processing algorithms including defect identification algorithms, edge detection algorithms, rotation determination algorithms, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In embodiments of the present invention, image sensor 140 may include one or more image sensors such as area-scan cameras, CCD cameras, an array of area-scan cameras, or the like. Image sensor 140 may detect various wavelengths of radiation from infrared to ultra violet. In other embodiments, image sensor 140 may detect other types of radiation, such as electron beam back scatter, X-ray emissions, and the like.

In embodiments of the present invention, platform 150 allows work piece 155 to be positioned relative to image sensor 140. For example, platform 150 may include x, y, z, and e translation controls, and the like. Using such controls, platform 150 can be used to position work piece 155 relative to image sensor 140 with a high level of accuracy and repeatability. For example, in one embodiment, work piece 155 can be positioned relative to image sensor 140 with a rotational offset of less than $1/100$th of a degree. In light of the present disclosure, one would recognize that many currently available or later developed platforms may be used in the present embodiments. For example, platform 150 may be relatively stationary or have a higher or lower positioning precision than that described above. Generally what is desired is that the entire (or portion of) work piece 155 of interest being imaged by one or more sensors 140. The adaptive scaling algorithm effectively handles misalignment between each sensor, individually, and work piece 155 (e.g. a display).

FIG. 1 is representative of an inspection system capable of embodying the present invention. It will be readily apparent to one of ordinary skill in the art that additional hardware and software may be added or be removed from FIG. 1, and still be an embodiment of the present invention contemplated herein. The use of other micro processors are also contemplated, such as Pentium™ or Itanium™ microprocessors; Opteron™ or AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
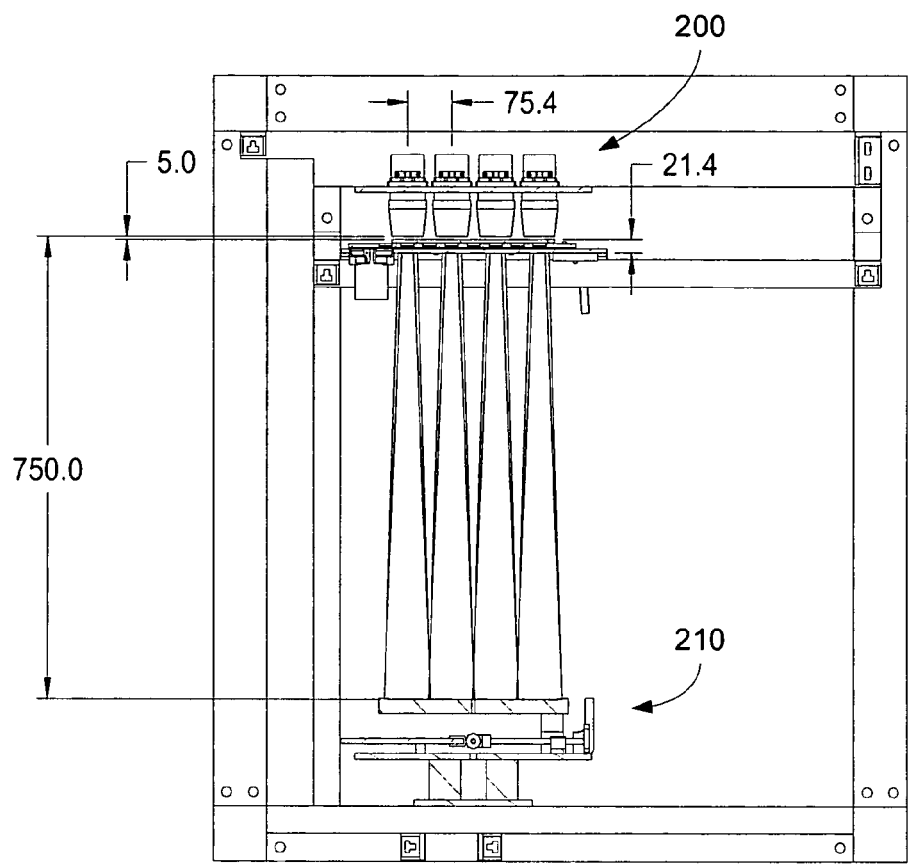
FIGS. 2A-C illustrate an embodiment of the present invention.
Figure 2B:
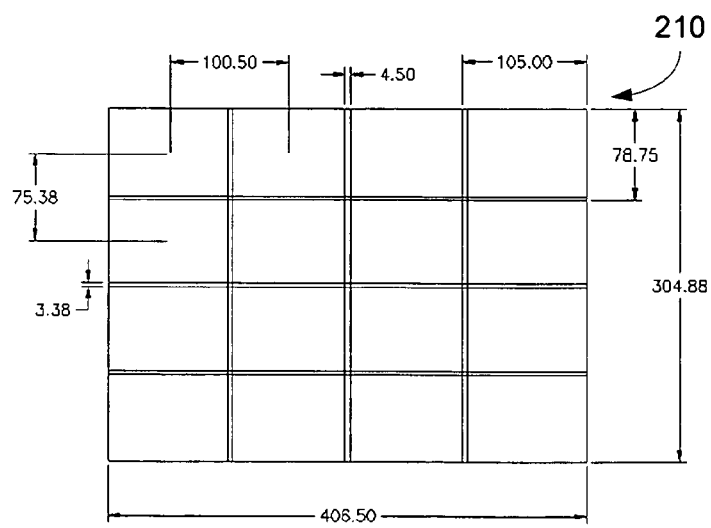
Figure 2C:
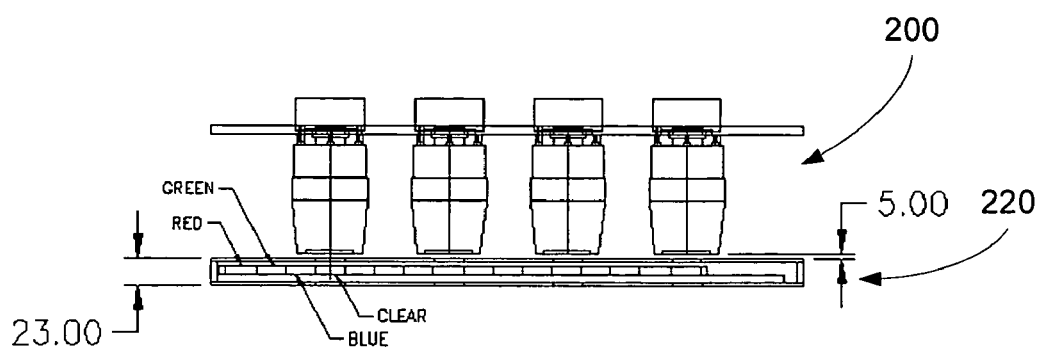

FIG. 2A-C illustrates an embodiment of the present invention. More specifically, FIGS. 2A-C illustrate typical image sensing configurations.

FIGS. 2A-C illustrate an array of sensors 200 that are adapted to capture images from different portions of a substrate 210.

In the present embodiments, each sensor from array of sensors 200 is a 1600×1200×8 bit CCD (2 megapixel). In this example, the typical sensor pixel size is 7.4 microns. In other embodiments of the present invention, sensors of higher or lower resolution may also be used, and the ratio of horizontal to vertical pixels may be different. For example, sensors having 3, 4, 5, 6, etc. mega pixels may be used, and sensors having horizontal to vertical pixels ratios of 1:1, 4:3, 16:9, 1.85:1, or the like may also be used.

In the present embodiment, each sensor 200 includes a 77 mm focal length lens (e.g. 35 mm format), although others may also be used. This gives each sensor 200 an angle of view of approximately 8.0 degrees, and the field of view of 105 mm wide. Further, as shown, in the embodiment, sensors 200 are positioned approximately 750 mm from the surface of substrate 210.

In one embodiment of the present invention, substrates 210 are liquid crystal displays (LCDs) having resolutions from 1024×768 to 1920×1280. In the future, higher resolution displays, such as 3840×2400 are also contemplated. Additionally, work pieces currently range in size from 15" to 56" in the diagonal. In the future, sizes of work pieces may be smaller or larger. In addition, other types of substrates other than LCDs may be inspected with embodiments of the present invention, such as plasma displays, electro luminescent (EL) displays, organic light emitting diode displays (OLEDs), liquid crystal on semiconductor (LCOS), silicon-based displays (e.g. Sony silicon crystal reflective display (SXRD)), or the like.

As illustrated in FIG. 2A, an array of sensors 200 is configured to capture images of substrate 210. As illustrated in FIG. 2B, in this example, sixteen sensors 200 are used to capture sixteen different portions of substrate 210. In other embodiments, the number of sensors may vary. As illustrated, some overlap between images captured by sensors 200 are desirable to cover all display pixels considering the misalignment between sensors, and to ascertain detection of small defects (e.g. spots with 4×4 display pixel area) located in the overlapping areas. In one embodiment, the images overlap in the x/y directions by approximately 4.5 mm/3.375 mm or approximately 16/12 display pixels; the top and bottom images from sensors 200 extend over the top edge and bottom edge of substrate 210 by approximately 3.375 mm, although these values typically vary.

In embodiments of the present invention, substrates 210 include display pixels having red, green, and blue component sub-pixels. To more accurately inspect such substrates 210, as shown in FIG. 2C, a color filter assembly 220 (e.g. a rotating color wheel) may be provided in front of sensors 200.

Embodiments of the present invention are able to easily handle a range of panel sizes without changing the optical/sensing configuration, and provides a highly orthographic projection of substrate 210 with reduced optical/geometrical distortion. Additionally, such embodiments provide a desirable minimum magnification ratio of 4.0 between the sensor pixels and displays pixels. Accordingly, it enables the system to be able to calculate more accurate coordinates of sub-pixel defects (i.e., a red or green or blue display sub-pixel) and sub-sub-pixel defects (i.e., a portion of a red or green or blue display sub-pixel), stuck-on/stuck-off sub-pixels and line defects, partially dimmer or brighter sub-pixel and line defects, and the like.

In other embodiments, variations of the above embodiment are contemplated, such as sensors 200 with auto-focus, with internal R/G/B/N filters, sensors 200 that may be repositioned in x, y, and z, and the like (in order to accommodate large range of display sizes and resolutions).

One desired trait of embodiments of the present invention is to provide a minimum level of image focus. This allows the embodiment to detect very small defects such as R/G/B sub-pixel defects or even sub-sub-pixel R/G/B defects.

In other embodiments of the present invention, another class of substrate defects can also be detected. This includes defects that are low-contrast, with or without significant off-axis component, that are relatively larger than R/G/B sub-pixel-defect sizes, and the like. For detection of this class of defects, focused images are not necessarily required. Accordingly, in such embodiments, any Moire-pattern formed due to a mismatch between sizes of the display pixel and sensor pixel can be reduced by optical smoothing or image processing. In such embodiments, an on-axis sensor, such as sensors 200 and off-axis cameras need not be focused.

In one embodiment, the two classes of substrate defects may be performed by the inclusion of focused on-axis sensor array and not focused off-axis sensors 200, or on-axis sensors that may be focused and unfocused using their integrated auto-focus mechanisms.

Figure 3:
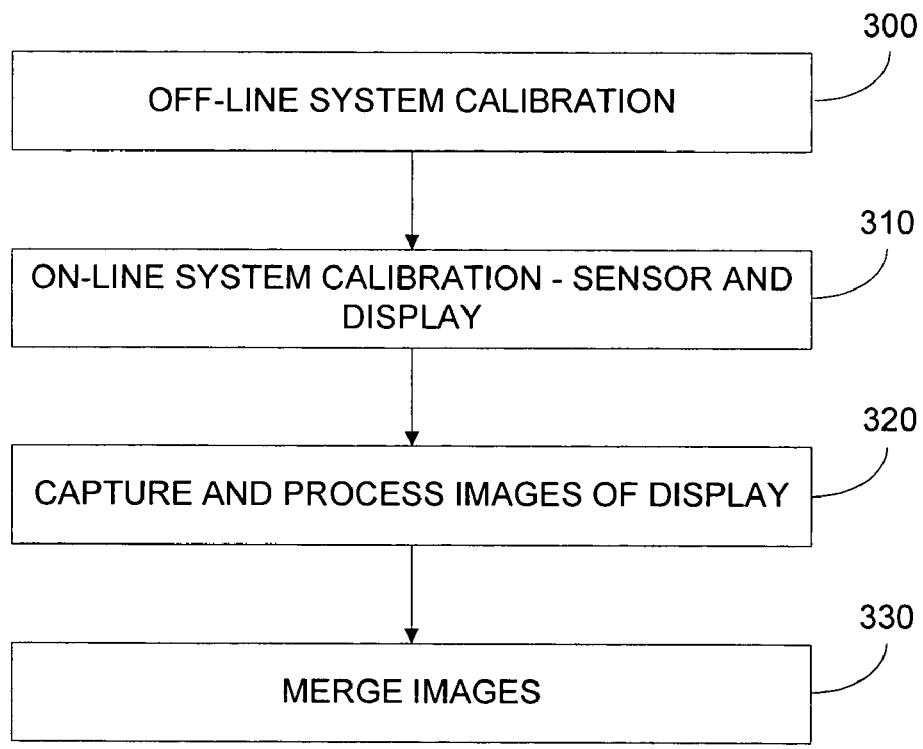
FIG. 3 illustrates a block diagram of a process flow according to an embodiment of the present invention.

FIG. 3 illustrates a flow diagram according to an embodiment of the present invention. Initially, the inspection system is calibrated, step 300. This calibration process is typically performed before initiating image processing functions, described below. In one embodiment, the off-line calibration includes electronic calibration of each sensor or camera, such as adjusting the camera gain and offset. The focus level of each sensor can also be set according to desired focus metric (i.e. focused or defocused.)

In this embodiment, each sensor is then calibrated with respect to luminance ratio. This calibration process includes establishing relative Red to White, Green to White and Blue to White luminance ratios for a series of test patterns (e.g. video level 44 of 255, video level 127 of 255, video level 255 of 255, and the like (8-bit). The luminance ratios are typically characterized and determined for each flat-panel model and for each sensor. In the present embodiment, this calibration is used to establish an optimal exposure times for Red/Green/Blue color test patterns during on-line testing.

In this embodiment, off-line mechanical x, y and θ adjustments of each individual sensor relative to the work piece are also performed.

Next, in FIG. 3, a series of on-line calibration steps are performed, step 310. In the present embodiment, initially an optimal exposure time is estimated for various gray-scale test patterns (e.g., RGB uniformly set to gray scale 44 of 255, 127 of 255, and 255 of 255). In practice, the inventors have noted that there is often a significant amount of luminance variation between different flat-panel displays and even often within the same display panel (e.g., between the center and corners). As a result, the exposure times needed to be adapted for each sensor individually, and for each panel, and for each test-pattern combination.

In the present embodiment, an additional function typically performed in step 310 is an (accurate) determination of the position and orientation of each sensor individually, relative to the display panel. In order to perform this, a number of "offset" and "scaling" parameters are estimated. This includes, a relative offset in the x direction, a relative offset in the y direction, a scale factor in the x direction, a scale factor in the y direction, and an angle, Dθ, between the display and each individual sensor. The position and orientation vary for each individual color (red, green, blue, white), accordingly, the calibration procedure is performed for each individual sensor for each individual color. These parameters will be illustrated below.

In the present embodiment, the determination of the above parameters is typically performed for each color separately: red, green, blue and white due to different refractions of different colors of light through the various optics. More specifically, because the refraction index is different for different colors of light and because the degree of parallelness between each color filter to each CCD sensor is different, the calibration process must be performed separately for each color and each camera. For example, for green test patterns, the calibration pattern consists of green sub-pixel landmarks, and a green filter in front of the sensors. A similar process is performed for blue test patterns, red test patterns, and gray scale test patterns.

In FIG. 3, the next step illustrated is capturing, processing, and analyzing data, step 320. In the present embodiment, by providing an array of image sensors, this enables the system to, in parallel, capture, process, and analyze data. The parallel operation decreases cycle time while capturing and processing/analyzing a significant number of calibration and test patterns (e.g., more than 700 MB of raw image data for each cycle). Additionally, the parallel operation increases inspection throughput. More detailed processes for capturing, processing and analyzing the images will be given below.

In FIG. 3, the next step illustrated in merging of results, step 330. In embodiments of the invention described above, an array of sensors is used to capture the entire display substrate. In order to detect defects that fully or partially span more than one sensor, the defect data are merged. This process is called XY Merging. By performing the merging function, a defect that is fully or partially inside overlapped areas of two or more sensors (e.g., a gap mura, a vertical/horizontal line mura, or the like) and is detected by two or more sensors is merged and only one defect is reported. In one embodiment, the average values from the sensors are used for reporting some of defect features (e.g., relative contrast). In other embodiments, other defect features such as area, bounding box and binary centroid coordinates are recalculated based upon the merged defect data and then reported.

In additional embodiments of the present invention, a Z merging function is performed, where defect data based upon different display patterns are merged together. As examples, a defect can be detected in the same location but when displaying different display patterns (e.g., an impurity in white=127 (W127) and red=127 (R127) test patterns); different types of defects can be detected in the same location (i.e., overlapping each other) but within the same or in different display patterns (Test Scenes) (e.g., an impurity defect and a dot/sub-pixel defect at the same location). In still other embodiments, x, y, and z merging may both be used to detect various defects.

Figure 4:
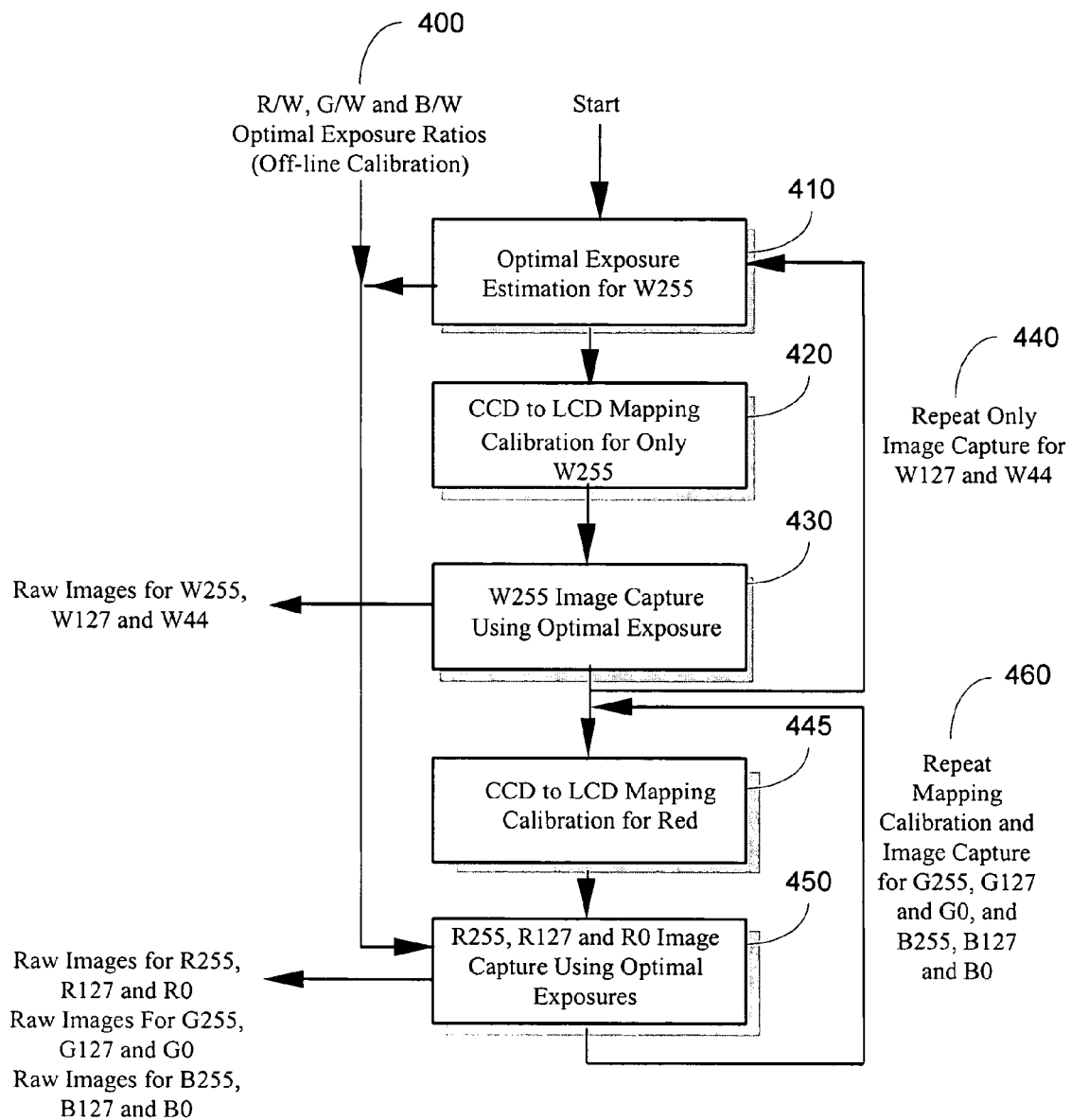
FIG. 4 illustrates a block diagram of a process flow according to an embodiment of the present invention.

FIG. 4 illustrates a flow diagram according to an embodiment of the present invention. More particularly, FIG. 4 illustrates a process of capturing different display patterns (Test Scenes) displayed on the display substrate with the array of sensors.

As shown in FIG. 4, the luminance ratios determined in step 300, above are provided, 400. As discussed above, the luminance ratios establish a red versus white, green versus white, and blue versus white ratio that is used to adjust the exposure time for red, green, and blue display patterns. Next, as shown, an estimation of the optimal exposure time for white test patterns, discussed in step 310, above, is determined, step 410.

Additionally, the determination of the position and orientation of each sensor, individually, relative to the display panel (mapping calibration) also discussed in step 310, above is performed, step 420.

Next, in the present embodiment, images of the display are captured with the array of sensors, step 430. In this embodiment, the display is driven with uniformly gray-scale test images (test scenes), for example r, g, b=255, and the array of sensors captures one or more images of this test scene. In this embodiment, the exposure time determined in step 410 is used to set the exposure time.

In various embodiments, the process above repeats for gray-scale test images with different intensities, for example for r, g, b=127, then for r, g, b=44, or the like, step 440.

In the present embodiment, the determination of the position and orientation of the red pixels in the display panel relative to the sensor pixels in each sensor (mapping calibration), also discussed in step 310, above is performed, step 445. In embodiments of the present invention, step 310 is typically performed once for r, g, b, and white, and the calibration data is simply retrieved in this step.

Next, in the present embodiment, images of red test patterns on the display are captured with the array of sensors, step 450. In this embodiment, the display is driven with uniformly red test patterns (test scenes), for example r=255, and the array of sensors captures one or more images of this test scene. In this embodiment, the exposure time determined in step 410, and the red to white ratio determined in step 300, is used to set the exposure time. In various embodiments, the process above repeats for red test patterns with different intensities, for example for r=127, then for r=0, or the like.

Next, the process described in steps 445 and 450 are typically repeated with green test scenes and blue test scenes, step 460.

In one embodiment of the present invention, to capture more subtle dot and line defects, the inventors have determined that at least two captures with different exposure times are required for some test scenes (e.g. r=127, r=0, b=127, b=0, g=127, g=0). In the prese embodiment, as a result of this process, a total number of images captured by each camera are at least eighteen "RAW" images. A greater or lesser number of images may be captured by other embodiments of the present invention based on engineering considerations and specific processing requirements.

Figure 5:
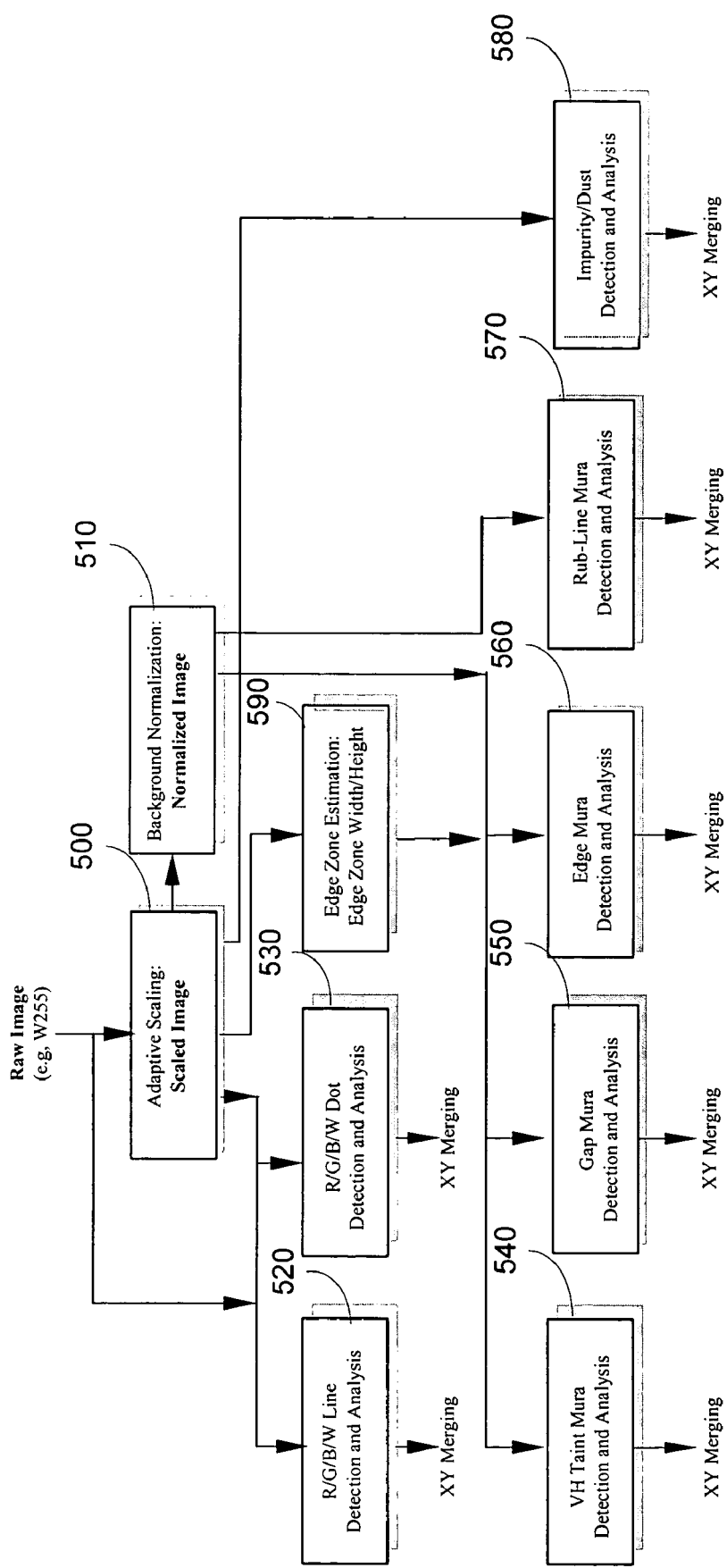
FIG. 5 illustrates a block diagram of a process flow according to an embodiment of the present invention.

FIG. 5 illustrates a flow diagram according to an embodiment of the present invention. More particularly, FIG. 5 illustrates a process for processing and analyzing raw, scaled-down, and/or normalized images.

As seen in the embodiment in FIG. 5, the captured images (raw images) are processed with an adaptive scaling process to form a low-resolution image ("scaled-down image"), step 500, and a normalization process to normalize the image, step 510. Further details of these processes will be discussed below.

In the present embodiment, a design strategy optimization used to facilitate the detection and analysis of defects in an image is by processing both raw images and the scaled-down images. More specifically, global detection of candidate defects are determined from the scaled-down image, and then based upon the candidates, fine local analysis is performed on the raw image or normalized image, depending on defect type. The inventors of the present invention have determined that this coarse to fine processing strategy significantly improves true-defect detection, reduces false-defect rejection, and improves fine-characterization of defects.

As is shown in FIG. 5, a number of detection and analysis modules, 520-580 are provided for identification and analysis of specific types of defects, such as line detection and analysis, impurity/dust detection and analysis, and the like. For some types of defects, such as analyzed in analysis modules 540-560, an additional module 590 is provided to identify an edge zone within the image.

FIGS. 6A-D illustrate embodiments of the present invention. More specifically, FIGS. 6A-D illustrate a number of mapping parameters between the each sensor space and the display panel space. As mentioned in step 310, above, typical mapping parameters include x and y offsets, x and y scale factors, and a rotation (Dθ).

Figure 6A:
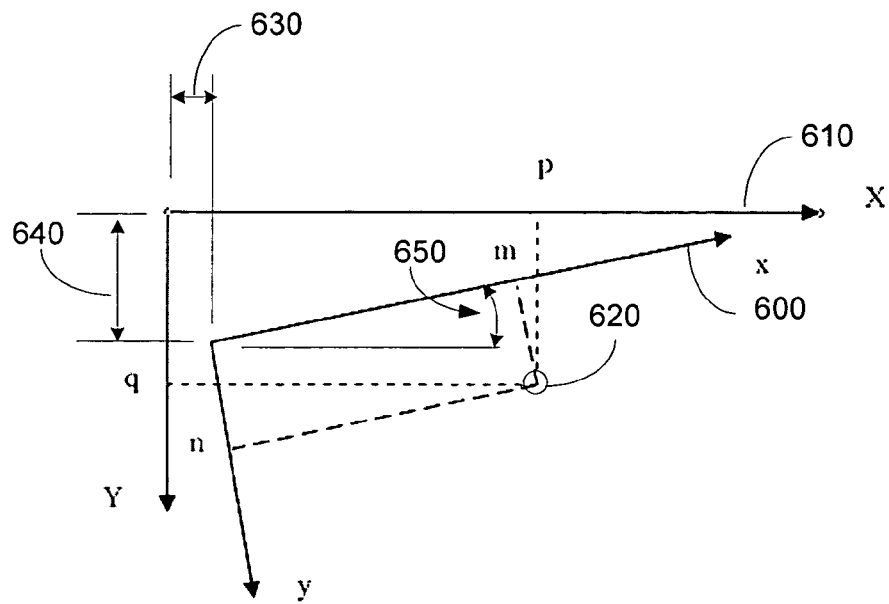
FIGS. 6A-D illustrate an example of an embodiment of the present invention.

In the example in FIG. 6A, a display coordinate frame x, y 600 and a sensor coordinate frame XY 610 are shown. In this example, a display pixel centered at pixel coordinate (m, n) 620 in coordinate frame 600 is mapped to a sensor pixel coordinate (p, q) 620 in coordinate frame 610. In the present embodiment, m and n are typically integers whereas p and q are typically floating point numbers. In one embodiment, the accuracy is to the first decimal place.

In the present embodiment, through proper calibration, an x offset DX 630 and a y offset DY 640 between the coordinate frames 600 and 610 can be determined. Additionally, a relative rotation Dθ 650 between the frames can also be determined by measurement. In one embodiment, the accuracy is to the first decimal place.

Further, in the present embodiments, the resolution of the display pixels per unit distance is typically larger than the sensor pixels per unit distance. Accordingly, multiple sensor pixels are adapted to acquire images from a single display pixel. In one embodiment, the magnification is from 4 to 4.5 sensor pixels per 1 display pixel in at least the x direction. In other embodiments, the magnification ratio may be lesser or greater.

In additional embodiments, the magnification may be the same or different in the y direction, depending upon the number of horizontal pixels. In one embodiment including square pixels, the magnification is the same in the horizontal and vertical directions. Through proper calibration for each color (including accurate estimation of misalignment between each sensor and the display) accurate magnification ratios in x and y directions can be calculated for each sensor. In this embodiment, the accuracy for scaling is to the third decimal place. The magnification ratios are referred to herein as Pitch_X and Pitch_Y.

Figure 6B:
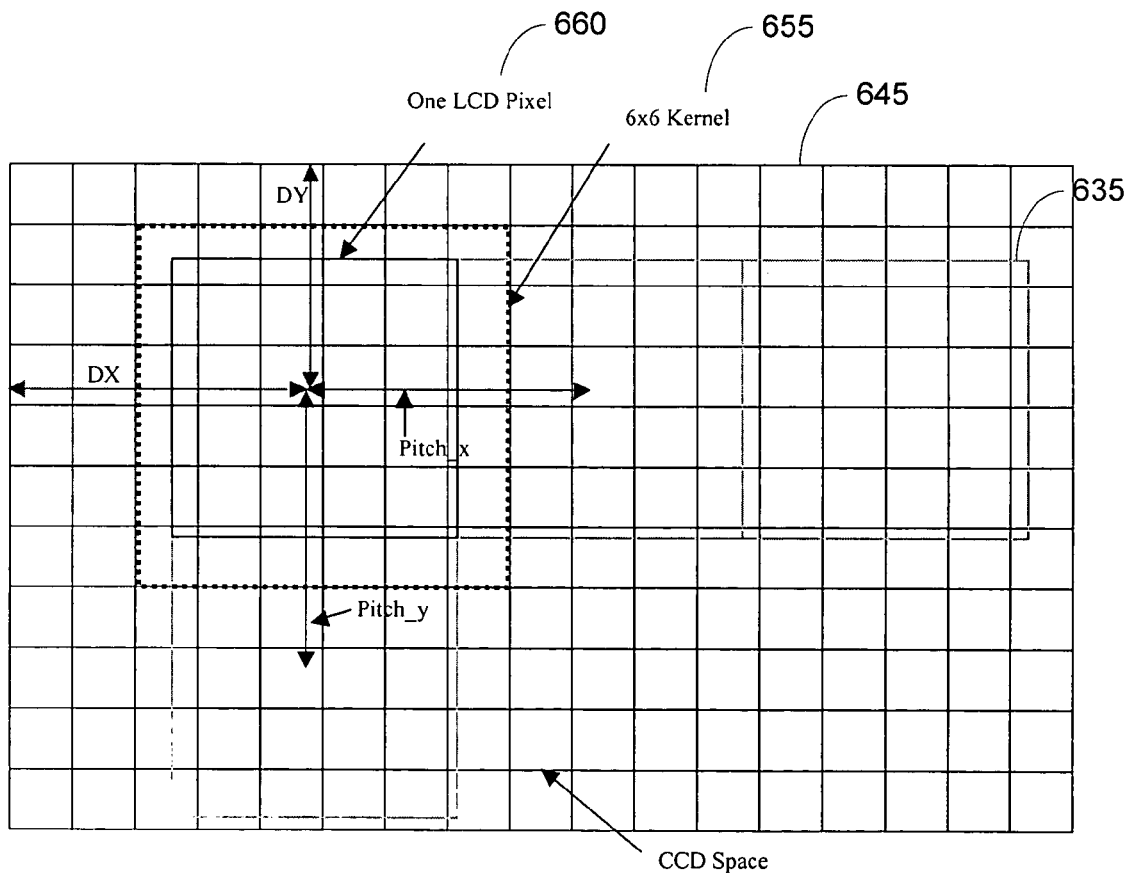

FIG. 6B illustrates an example of a mapping of a grid of display pixels 635 to a grid of sensor pixels 645 when the misalignment angle between the sensor and the display is zero. Such an embodiment is typically rare.

In embodiments of the present invention, depending upon the magnification ratios, an R×S sized kernel 655 of sensor pixels is shown associated with a top-left display pixel 660. In this example, the magnification ratio is between approximately 4 to 4.5 between the display pixel and the sensor pixel. In the present embodiment, R=S=6, and as shown, the entire display pixel 660 and the image of display pixel 660 is fully mapped within a 6×6 array of sensor pixels. In other embodiments of the present invention, kernel 655 may be enlarged for example to 7×7 to account for a larger Dθ (e.g. >25 degrees) 650 between grid 635 and grid 645. In various embodiments, the size of kernel 655 is selected such that a complete display pixel is captured by kernel 655 of sensor pixels.

Figure 6C:
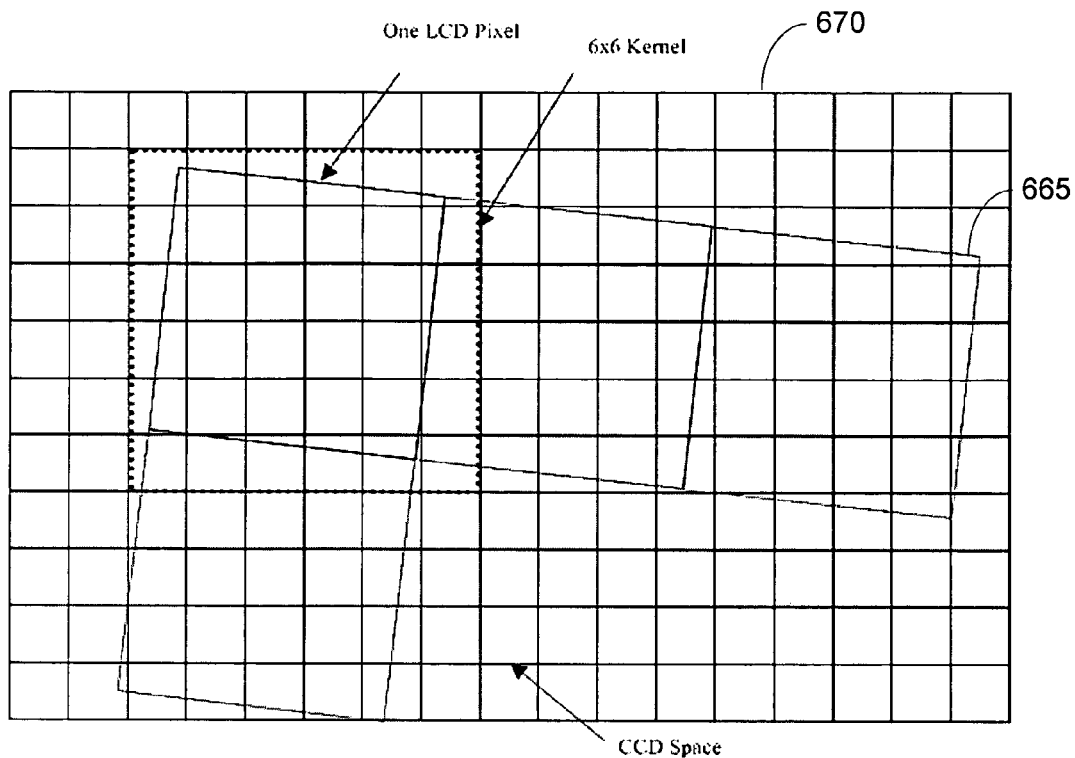

FIG. 6C illustrates a more typical mapping of a grid of display pixels 665 to a grid of sensor pixels 670.

Figure 6D:
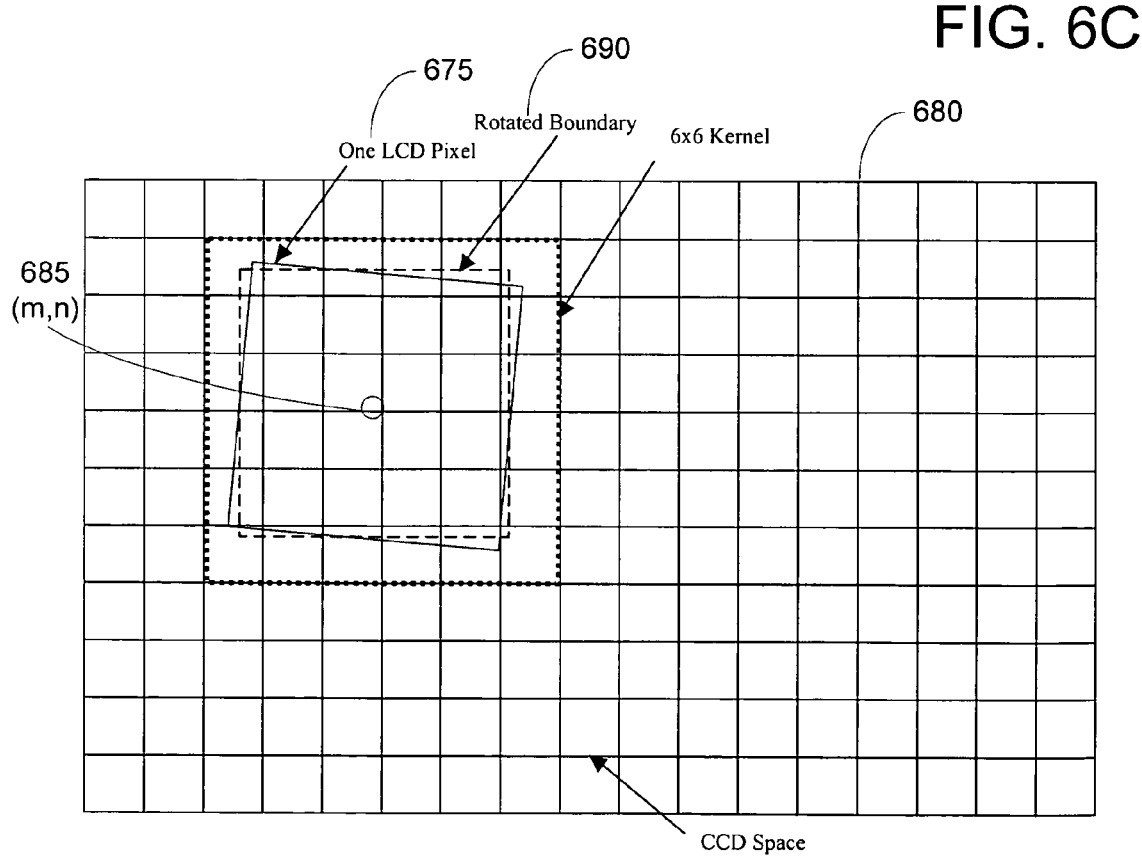

FIG. 6D illustrates another typical mapping of a display pixel 675 to a grid of sensor pixels 680. In one embodiment of the present invention, for small Dθ rotations, for purposes of the foregoing calculations of weighting values, display pixel 675 is assumed to be rotated around its center point (m,n) 685 and aligned with area 690. In other embodiments, for larger Dθ rotations, the value of Dθ is included in the foregoing calculations of weighting values. In the example in FIG. 8A, a small Dθ is assumed, accordingly the display pixel captured in that figure appears perfect aligned in the x and y direction.

Figure 7A:
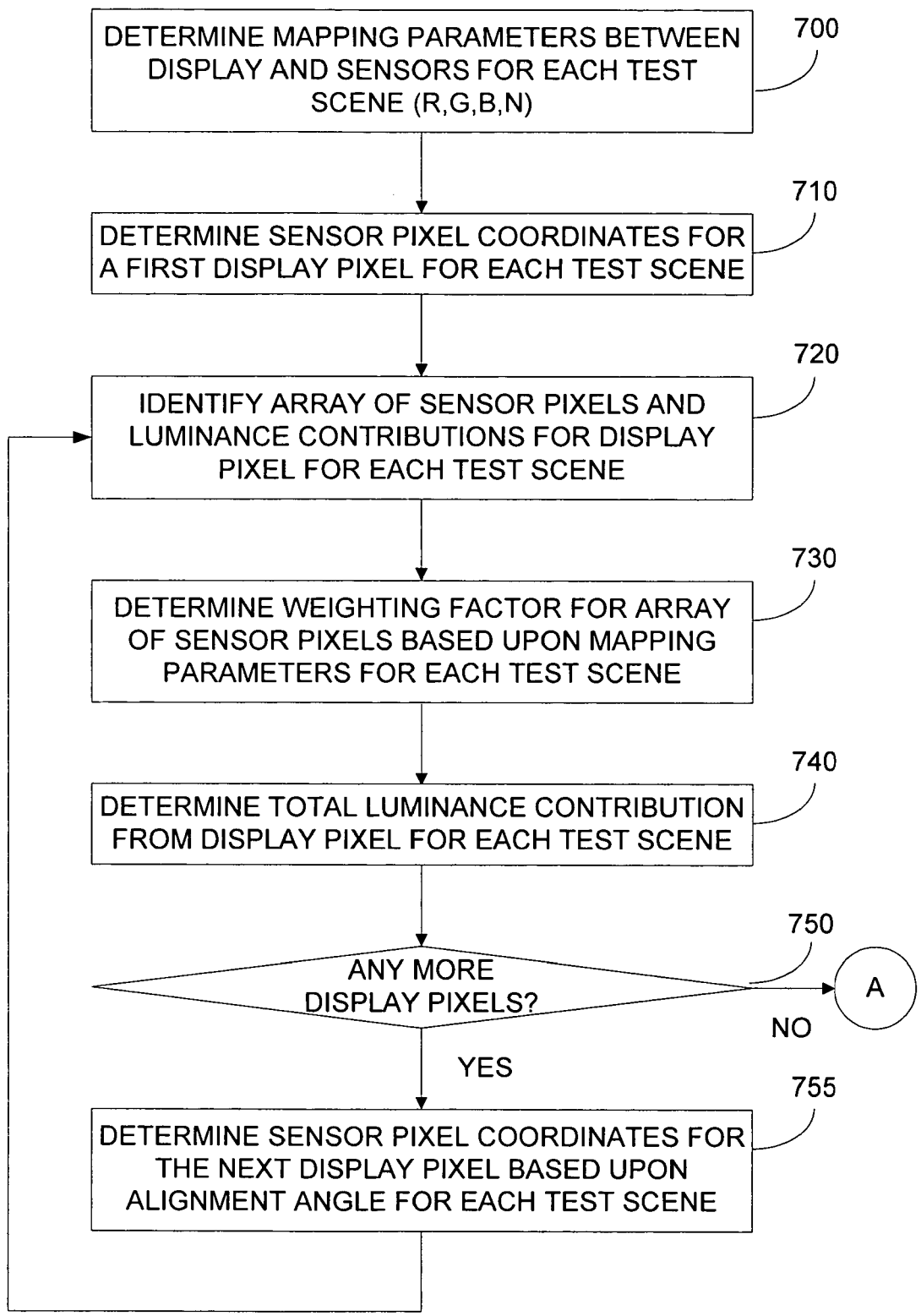
FIGS. 7A-B illustrate a block diagram of a process flow according to an embodiment of the present invention.
Figure 7B:
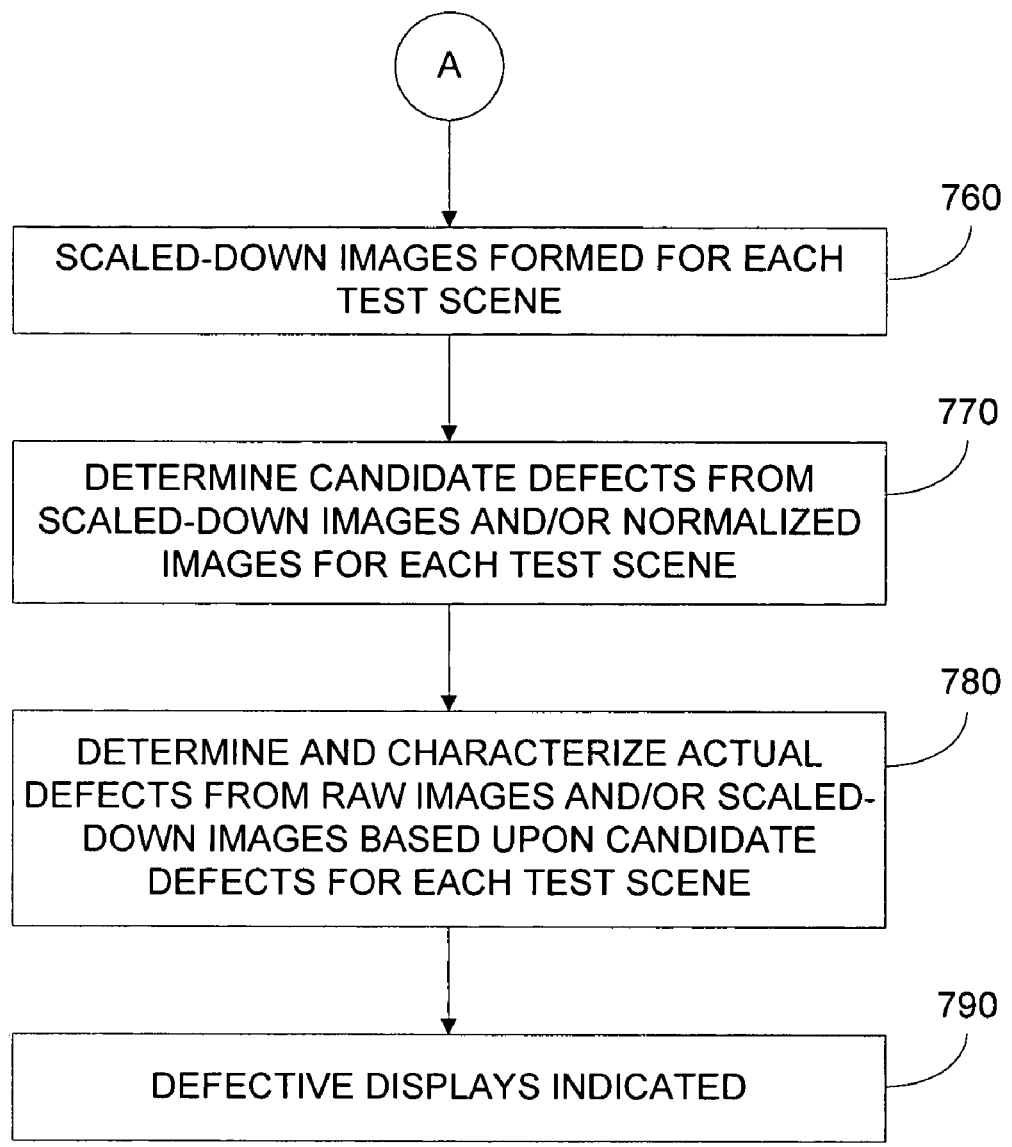

FIGS. 7A-B illustrate a flow diagram according to an embodiment of the present invention. More particularly, FIGS. 7A-B illustrate a process for adaptively scaling images.

Initially, the mapping parameters are determined between a display grid and a sensor grid, step 700. As discussed, above, these parameters include x and y offset, and x and y pitch, and Dθ. In other embodiments Dθ may be larger, as will be illustrated below. As discussed above, the mapping is typically performed for each sensor relative to the display substrate, and in response to multiple red, green, blue, and white test scenes. In one embodiment, DX, DY, Pitch_X, Pitch_Y, and Dθ are different for each camera relative to the display substrate. Further, for each sensor, the DX, DY, Pitch_X, Pitch_Y, and Dθ parameters may be different for each of the different colored test scenes.

Next, a display pixel of interest, at coordinates (m,n) is mapped to coordinates (p,q) in the sensor grid space, based upon the mapping parameters above, step 710. To begin with, the display coordinates of the first display pixel are typically=(0, 0) or the top, left-most display pixel. However, in other embodiments, any other display pixel may be initially selected.

As presented above, a kernel of R×S sensor pixels that bound the display pixel are then identified, step 720. In the present embodiment, each sensor pixel in the kernel may capture light emitted from the display pixel, if any. For the purposes of the present embodiment, the amount of radiation (e.g. light, luminance) received by each sensor pixel in the kernel is denoted $L_{ij}$ where i=1 to R and j=1 to S, where i is a variable that varies from 1 to the number of horizontal sensor pixels R and where j is a variable that varies from 1 to the total number of vertical sensor pixels S in the array of sensor pixels in the kernel. For example, where R=4 and S=5, there are 20 sensor pixels in the kernel and thus 20 luminance values; one luminance value representing the amount of light received by each sensor pixel in the kernel. For example $L_{11}$, $L_{12}$, $L_{13}$, ... $L_{iR}$, $L_{21}$, ... $L_{2R}$, ... $L_{S1}$, L ... $L_{SR}$. An illustration of this will be given below.

Additionally, because each sensor pixel in the kernel may be mapped to at least a portion of the same display pixel, mathematically, a weighting contribution is determined, step 730. In one embodiment, the weighting factor is set between 0 and 1, where 0 means that the sensor pixel does not capture any portion of the display pixel and 1 means that the display pixel fully covers the sensor pixel. For purposes of the present embodiment, the amount of the display pixel that covers a sensor pixel in a kernel is Wij where i=1 to R and j=1 to S. In this example, where R is 7 and S is 7, there are 49 sensor pixels in the kernel and thus 49 respective weighting factors.

In embodiments of the present invention, as presented in FIGS. 6C-D, if Dθ is small, the sensor pixel is assumed to be aligned to the x and y axis of the display grid for the purpose of calculating Wij. However, is some embodiments, Dθ is used to more accurately determine the amount of the display pixel that covers a sensor pixel. In other words, $W_{ij}$ is a function of Dθ is some embodiments. An illustration of this will be given below.

In the present embodiment, a total luminance contribution from the display pixel is calculated, step 740. In one embodiment, a total luminance value $I_{mn}$ for the display pixel is determine according to the following formula, again where i is a variable that varies from 1 to the number of horizontal sensor pixels R and where j is a variable that varies from 1 to the total number of vertical sensor pixels S in the array of sensor pixels in the kernel.

$I_{mn} = \Sigma(W_{ij} * L_{ij})$ for i=1 to R, and j=1 to S

In the present embodiment, the process is then repeated for each display pixel (m, n) in the image, step 750 (e.g. m=0 to horizontal display resolution (M), and n=0 to vertical display resolution (N)). In the present embodiment, the sensor coordinates corresponding to the next display pixel are then calculated, step 755. In one example the sensor pixel coordinates for the next display pixel to the right is determined in the sensor coordinate space according to the following relationship, where X(0)=p, and Y(0)=q:

$X(1) = X(0) + Pitch\_X * Cos(D\theta);$ $Y(1) = Y(0) + Pitch\_Y * Sin(D\theta)$ In other words, move the R×S kernel equal to one pitch in the x direction, but account for the misalignment angle Dθ in x and y.

Further, the sensor pixel coordinates for the display pixel coordinates in the next row is determined according to the following relationship, again where X (0)=p and Y (0)=q:

$X(1) = X(0) - Pitch\_X * Sin(D\theta);$ $Y(1) = Y(0) + Pitch\_Y * Cos(D\theta)$ In other words, move the R×S kernel equal to one pitch in the y direction, but account for the misalignment angle DO in x and y.

In the above examples Dθ is measured clock-wise with respect from the x-axis of the sensor grid to the x-axis of the display grid.

After the process completes, an image is formed, where each pixel location (m, n) includes a value Imn, determined above, step 760. This image is referred to above as a "scaled-down" image.

Using the process described above, the image acquired by each sensor was scaled down from the sensor image size to a portion of the display size. Each pixel in the scaled down image, represents a display pixel and has a higher dynamic range than the sensor image. For example, the sensor image is an 8-bit image with pixel resolution of 1600×1200 and the scaled down image is be approximately 400×300×12-bits for magnification ratio of 4.0 or approximately 355×266×12-bits with a magnification ratio of 4.5.

In some embodiments, the system then detects and analyzes the scaled-down image and the original sensor image (RAW image) using one of the analysis modules 520-580. More specifically, in some embodiments, modules use the scaled-down image to identify potential or candidate defects, step 770. Next, if candidate defects are identified, the original sensor image (RAW image) is processed to determine whether any of the candidate defects are actual defects and/or to determine the characteristics of the defects, step 780. In other embodiments, modules use a coarse detection strategy based on a global threshold on a normalized image, and use a fine analysis strategy based on a local threshold on a locally normalized image.

In various embodiments, x y merging of defect data is performed, as was described, to determine and/or characterize defects that span more than one sensor image.

In the present embodiment, if defects are identified by any of the analysis modules, based upon the characteristics of identified defects, the display may be rejected on the assembly line as being defective, step 790.

Figure 8A:
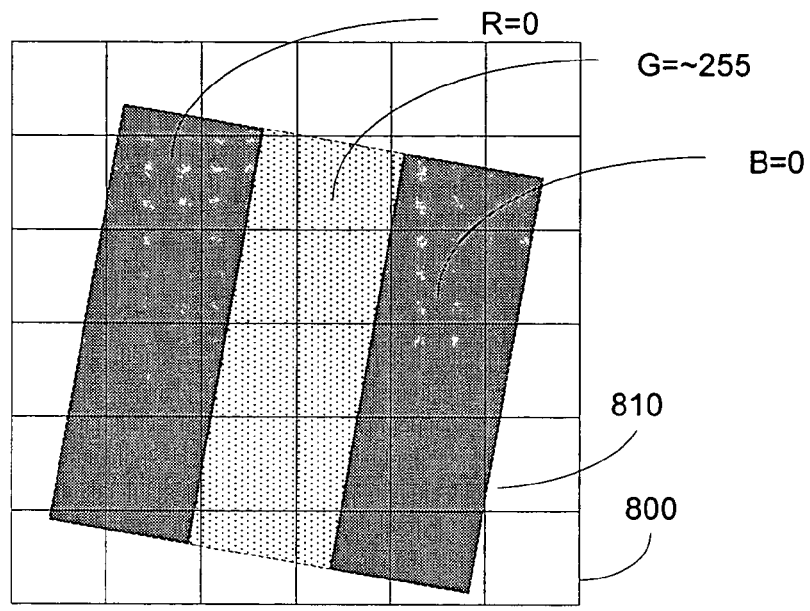
FIGS. 8A-B illustrate an example of an embodiment of the present invention.
Figure 8B:
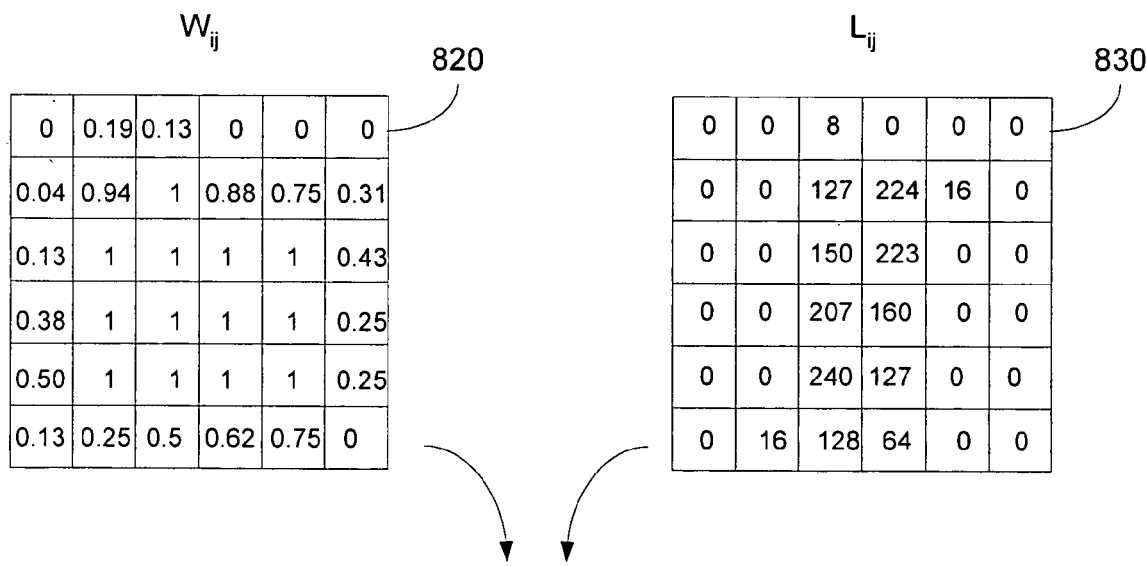

FIGS. 8A-B illustrates an example according to embodiments of the present invention. More specifically, FIGS. 8A-B illustrate the process of determining an illumination value for the scaled-down image. In this embodiment Dθ is ~10 degrees.

Illustrated in FIG. 8A is a grid of sensor pixels 800 and a display pixel 810. In this example, display pixel 810 includes red, green, and blue sub pixels, where the green sub-pixel is illuminated at the maximum brightness, in this example 255, and the red and blue sub-pixels are off (e.g. equal to 0). Additionally, a kernel of sensor pixels 820 is illustrated bounding display pixel 810.

In FIG. 8B, the weighting values $W_{ij}$ associated with each sensor pixel in kernel 820 is determined. As described above, these values may be determined mathematically based upon relative orientation of sensor pixels 800 and the display panel. Next, as illustrated, luminance values are sensed by each sensor pixel in kernel 820, as illustrated in array 830.

Using the summation relationship disclosed above, $I_{mn}$ is determined 840. As illustrated, this value is then used to represent the amount of illumination received from display pixel 810 when the green sub-pixel is fully on. The specific value may be scaled up or down according to engineering preference.

Figure 9A:
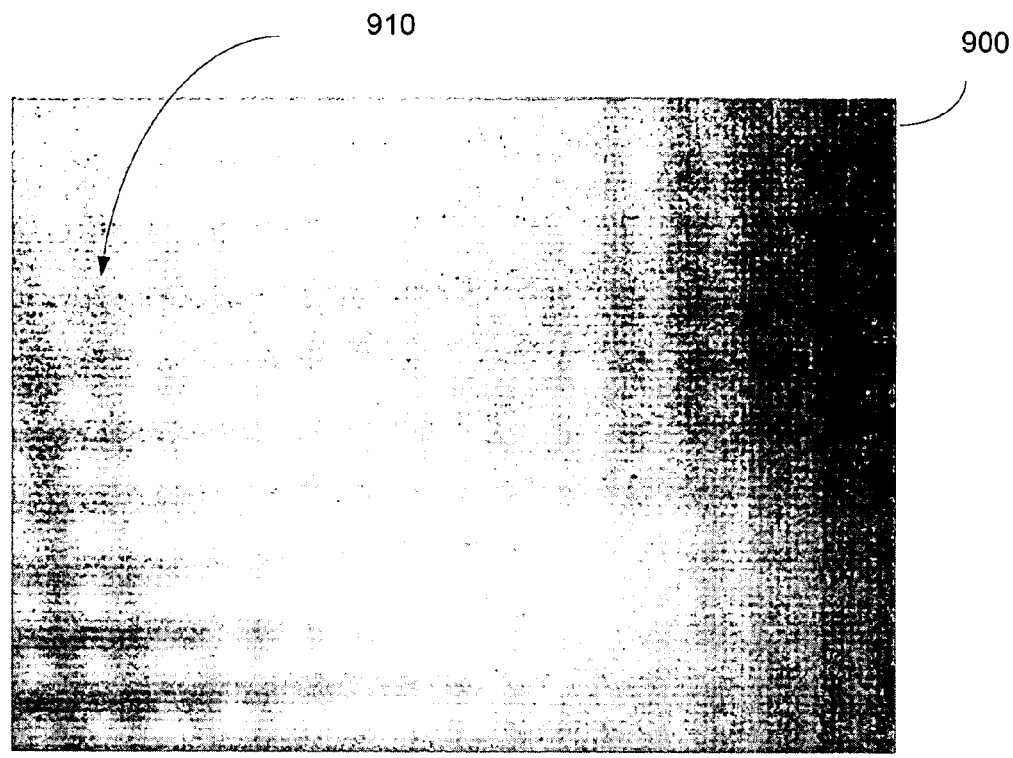
FIGS. 9A-B illustrate an example of an embodiment of the present invention.
Figure 9A:
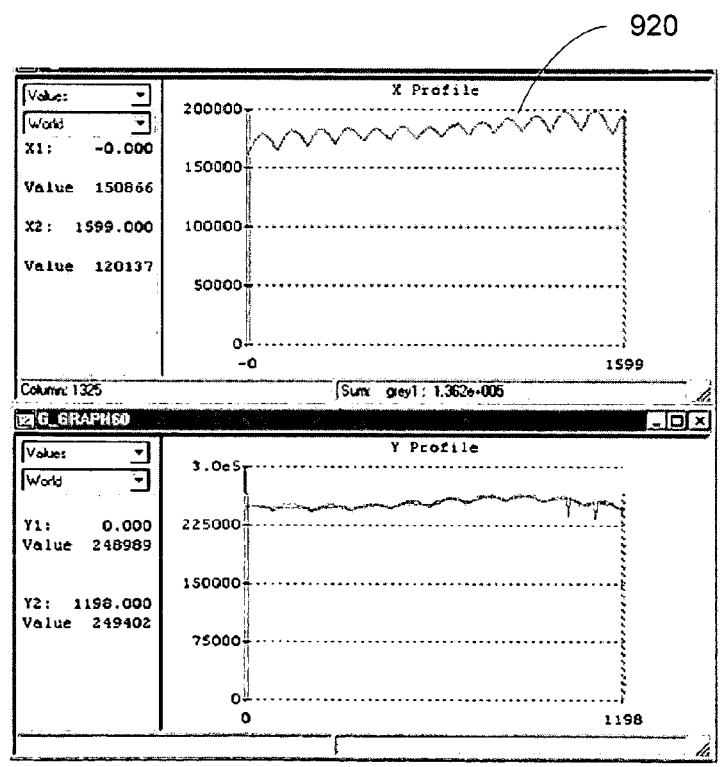
Figure 9B:
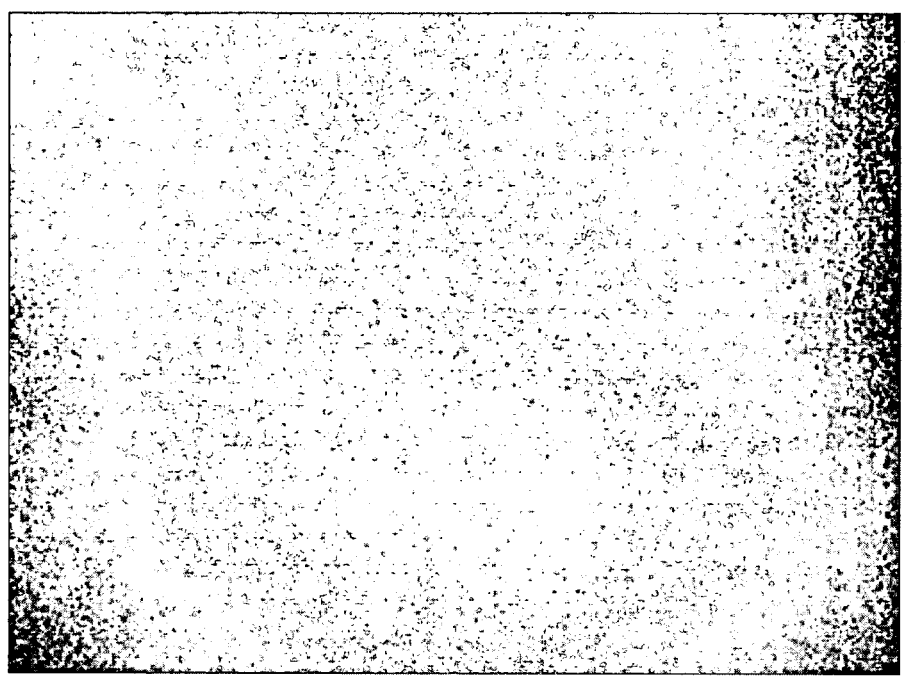
Figure 9B:
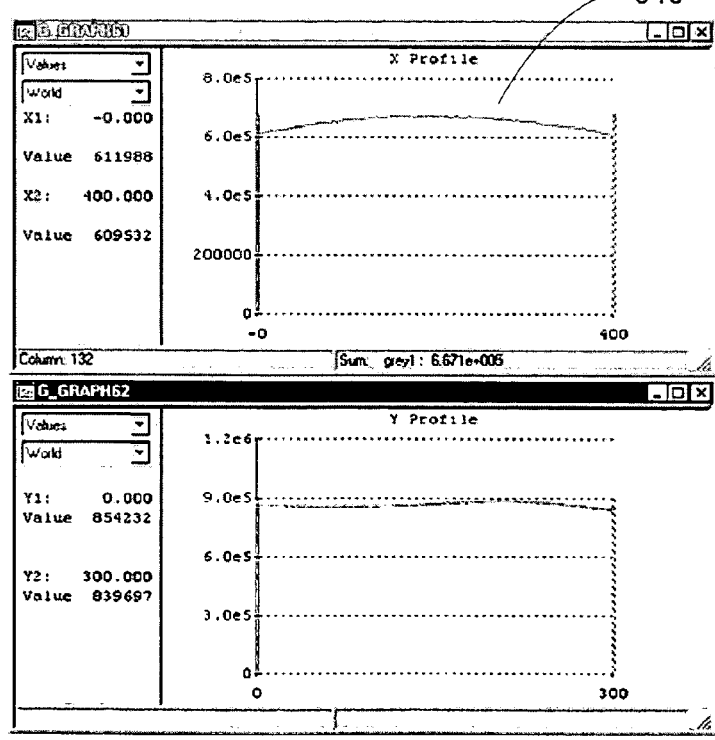

FIGS. 9A-B illustrate examples according to embodiments of the present invention. More specifically, FIGS. 9A-B illustrate an application of the Adaptive Scaling Algorithm to an image from a 15 inch LCD panel. In this embodiment, the magnification factor for the optical system used for this test was ~4.5, i.e. Pitch_X=Pitch_Y=~4.5.

In image 900, Moire pattern artifact noise 910 is clearly visible. The Moire pattern noise 920 is also clearly visible in a graph plotting the intensity projections in the X and Y directions for image 900. After an adaptive scaling process, as described above, as can be seen that Moire pattern artifact noise has been greatly reduced in image 930. The Morie noise suppression is also visible in graphs 940 plotting intensity projections in the X and Y directions for image 930.

In the present embodiment, as illustrated in FIG. 9B, edge pixels of the scaled image are typically darker. One reason for this is that the point spread function of a display pixel on the sensor pixel has a support base that extends typically more than 10 sensor pixels (i.e., larger than the magnification ratio of the optical system used, that is, 4 to 4.5). Accordingly, when the scaling algorithm described above is applied to edge pixels in the display, the total integrated energy is smaller than for display pixels that are not located at the edge of the panel. During the detection and analysis process, edge pixels are thus processed using different parameters.

As illustrated in FIG. 9B, the edge pixel issue is typically more apparent on the left and right sides of the display panel than on the top and bottom sides. This is typically due to the difference in the sampling frequency of a sub-pixel (Red, Green or Blue). For example, for a magnification ratio of 4 to 1, the sampling frequency of a sub-pixel along Y-axis is 4 to 1 whereas along X-axis the sampling frequency is 1.33 to 1.

In other embodiments of the present invention, many changes or modifications are readily envisioned. In light of the above disclosure, one of ordinary skill in the art would recognize that any number of combinations of hardware and software may be used to improve the inspection process. For example a greater number or a lesser number of image sensors may be used, the image sensors may be optical detectors such as CCD cameras, CMOS-based cameras, or the like; the image sensors may detect back-scatter radiation, for example as used in scanning electron microscopes, and the like; or the like.

In embodiments of the present invention, the adaptive scaling process described may be modified. In some embodiments, the magnification between the display pixel and sensor pixel may be increased, for example to obtain a magnification ration of 5 to 1 or 6 to 1 or greater in the x direction. In some embodiments, weighting factors may also depend upon the position of the sensor pixel within the kernel. For example, when inspecting for red sub-pixel defects, those sensor pixels on the left side of the kernel may be weighted more than the sensor pixels on the right side of the kernel. Additionally, the integral of the luminance may also have a linear or non-linear relationship. In still other embodiments, the compensation of the angle between the display grid and the sensor grid may be performed in different ways, for example, by not assuming that each individual display pixel is square relative to the sensor pixels when determining the total luminance of the display pixel.

Further embodiments can be envisioned to one of ordinary skill in the art after reading this disclosure. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for a computer system comprises:

capturing a first and a second image of a pixel on a display at coordinates (m, n) with an array of R×S sensors in an image sensor;

determining a first and a second set of coordinates on the image sensor that map to coordinates (m,n) on the display for a first and a second group of sub-pixels, respectively, in response to the first and second image, respectively;

determining a first and a second misalignment angle between the pixel on the display and the array of R×S sensors for the first group and the second group of sub-pixels, respectively;

determining a first and a second x magnification ratio of pixels in the display relative to sensors in the image sensor for the first group and the second group of sub-pixels;

determining a first and a second plurality of weighting factors Wij, where i=1 to R, and j=1 to S, respectively associated with sensors from the array of R×S sensors in response to the first and second misalignment angle, and the first and the second x magnification ratio, respectively;

determining a first and second plurality of luminance values Lij, where i=1 to R, and j=1 to S, respectively associated with the sensors from the array of R×S sensors;

determining a first and second luminance value Imn, according to the following relationship: Imn=Σ (Wij*Lij) for i=1 to R, and j=1 to S, in response to the first and second plurality of weighting factors and the first and second plurality of luminance values, respectively;

forming a first and a second reduced scaled image including a plurality of pixels, wherein a luminance value for a pixel at coordinate (m,n) in the first and the second reduced scaled image is determined in response to the first and the second luminance value Imn, respectively; and inspecting the first and the second reduced scaled image to identify potential defects of the pixel on the display.

2. The method of claim 1 wherein R=S, and R and S are selected from the group, 5, 6, 7.

3. The method of claim 1 wherein the first and the second plurality of weighting factors Wij, where i=1 to R, and j=1 to S, is also determined in response to the first and second set of coordinates on the image sensor.

4. The method of claim 1 further comprising determining an first and a second y direction magnification ratio of pixels in the display relative to sensors in the image sensor for the first group and the second group of sub-pixels.

5. The method of claim 4 wherein the first and the second plurality of weighting factors Wij, where i=1 to R, and j=1 to S are also determined in response to the first and the second y magnification ratio, respectively.

6. The method of claim 1 wherein the first and second luminance value Imn each have a greater bit-depth resolution than the first and the second plurality of luminance values from the plurality of luminance values Lij.

7. The method of claim 1 wherein the first group of sub-pixels and the second group of sub-pixels are selected, without replacement, from the group: red sub-pixels, green sub-pixels, and blue sub-pixels.

8. An inspection system comprises:
at least one sensor configured to acquire a first and a second image of a portion of a flat-panel display, wherein at least one array of R×S sensors are configured to capture a first and a second image of at least one display pixel in the flat-panel display;
a processing unit coupled to at least the one sensor configured to determine a defect in the flat-panel display in response to at least the first and the second image of the portion of the flat-panel display, wherein the processing unit comprises:
a processor configured to instruct the at least one sensor to capture the first image and the second image of the display pixel with the array of R×S sensors, wherein the processor is configured to determine a first and a second plurality of weighting factors Wij, where i=1 to R, and j=1 to S, respectively associated with sensors from the array of R×S sensors, for the first image and the second image, wherein the processor is configured to determine a first and a second plurality of luminance values Lij, where i=1 to R, and j=1 to S, respectively associated with the sensors from the array of R×S sensors in response to the first image and the second of the one display pixel, wherein the processor is configured to determine a first and a second luminance value Imn, in response to Wij and Lij for i=1 to R, and j=1 to S, wherein the processor is configured to determine a first and second scaled-down image including a plurality of pixels, wherein a luminance value associated with the one display pixel in the first and the second scaled-down image is determined in response to the first and the second luminance value Imn, respectively and wherein the processor is configured to inspect the first and second scaled-down image to identify potential defects of the pixel on the display.

9. The inspection system of claim 8 wherein R=S, and R and S are selected from the group: 5, 6, 7.

10. The inspection system of claim 8 wherein the processor is also configured to determine a first and a second vertical offset between the one display pixel relative to the first image and the second image.

11. The inspection system of claim 8 wherein the processor is also configured to determine a first and a second offset angle between the one display pixel relative to the first image and the second image.

12. The inspection system of claim 10 wherein the processor is also configured to determining a first and a second horizontal pitch relative to the one display pixel and to the array of R×S sensors.

13. The inspection system of claim 11 wherein the processor is also configured to determine a first and second vertical offset between a second display pixel relative to the sensor in response to the first and second offset angle.

14. The inspection system of claim 8 wherein the display comprises a liquid crystal display having pixels comprising red, green and blue sub-pixels.

15. A method for a computer system comprises:
capturing a first image of at least a portion of a display, wherein an image of a first sub-pixel in a display pixel is captured with an array of sensor pixels in an image sensor;
capturing a second image of at least the portion of a display, wherein an image of a second sub-pixel in the display pixel is captured with the array of sensor pixels in the image sensor;
determining a first position and a first orientation of the display with respect to the image sensor in response to the first image;
determining a second position and a second orientation of the display with respect to the image sensor in response to the second image;
for each sensor pixel in the array of sensor pixels, determining a first percentage of overlap of the sensor pixel on top of the display pixel in response to the first position and the first orientation;
for each sensor pixel in the array of sensor pixels, determining a second percentage of overlap of the sensor pixel on top of the display pixel in response to the second position and the second orientation;
for each sensor pixel in the array of sensor pixels, determining a first intensity value in response to the first image of the display pixel;
for each sensor pixel in the array of sensor pixels, determining a second intensity value in response to the second of the display pixel;
determining a first weighted intensity value associated with the display pixel in response to the first percentage of overlap for each sensor pixel and in response to the first intensity value for each sensor pixel;
determining a second weighted intensity value associated with the display pixel in response to the second percentage of overlap for each sensor pixel and in response to the second intensity value for each sensor pixel;
forming a first scaled image in response to the first weighted intensity value;
forming a second scaled image in response to the second weighted intensity value; and
inspecting the first and the second scaled images to determine potential defects in the display.

16. The method of claim 15 further comprising:
processing the first image of the portion of the display to determine defects in the display in response to the potential defects.

17. The method of claim 15 wherein the first position comprises an x and y offset, and wherein the first orientation comprises an angle of rotation.

18. The method of claim 15 wherein inspecting the first and second scaled images further comprises: normalizing the first and second scaled images to form a first and second normalized image; and
inspecting the first and second normalized image for defects.

19. The method of claim 15 wherein the first sub-pixel and the second sub-pixel are selected without replacement from the group: red sub-pixel, green sub-pixel, blue sub-pixel.

20. The method of claim 15
wherein the first sub-pixel is a red sub-pixel; and
wherein capturing the first image of at least the portion of a display also comprises capturing the first image of at least the portion of the display through a red-colored filter.

* * * * *